United States Patent [19]
Green

[11] Patent Number: 5,939,101
[45] Date of Patent: Aug. 17, 1999

[54] MOLD VENTS

[75] Inventor: Thomas Benjamin Green, Birmingham, United Kingdom

[73] Assignee: Dunlop Tyres Ltd., Birmingham, United Kingdom

[21] Appl. No.: 09/063,052

[22] Filed: Apr. 21, 1998

[30]    Foreign Application Priority Data

Apr. 29, 1997  [GB]  United Kingdom ............. 97085849

[51] Int. Cl.$^6$ .................................................. B29C 33/10
[52] U.S. Cl. ......................... 425/28.1; 249/141; 425/812
[58] Field of Search .......................... 249/141; 425/28.1, 425/812

[56]              References Cited

U.S. PATENT DOCUMENTS

| 2,290,510 | 7/1942 | Talalay ................................. | 249/141 |
| 3,941,528 | 3/1976 | Cotterell ............................... | 249/141 |
| 4,347,212 | 8/1982 | Carter ................................... | 425/812 |
| 4,351,789 | 9/1982 | Sidles et al. ........................... | 425/812 |
| 4,431,047 | 2/1984 | Takeshima et al. .................. | 425/812 |
| 4,492,554 | 1/1985 | Carter ................................... | 425/28.1 |
| 4,708,609 | 11/1987 | Yoda et al. ........................... | 425/28.1 |
| 4,795,331 | 1/1989 | Cain et al. ........................... | 425/28.1 |

FOREIGN PATENT DOCUMENTS 2302906  7/1974  Germany .

OTHER PUBLICATIONS

Patent Abstracts of Japan, vol. 009, No. 164 (M–395), Jul. 10, 1985, corresponding to JP 60–040218 (Mar. 2, 1985).

*Primary Examiner*—James P. Mackey

[57]              ABSTRACT

A vent for a mold having a mold cavity comprising a vent main body, a valve closure member having an upper end face for positioning at the surface of the mold cavity, the valve closure member being moveable with respect to the vent main body for opening and closing the vent, a spring opening mechanism formed integrally with the vent main body for opening the vent, and a valve seat between the valve closure member and the main body wherein the vent is closed by material in the mold cavity contacting the upper end face of the valve closure member.

10 Claims, 2 Drawing Sheets

MOLD VENTS

FIELD OF THE INVENTION

The present invention relates to vents for molds used in forming vulcanizable rubber or other such moldable materials, and particularly, but not exclusively to vents for tire molds.

DESCRIPTION OF RELATED ART

In the molding of rubber articles such as tires, the initial heating of the tire surf ace in contact with the hot mold reduces the viscosity of the surface rubber so that under the influence of internal molding pressure local rubber flow occurs. Venting is required to allow pockets of air which may become trapped between the green tire carcass and the hot mold surface to escape so that every part of the curing tire surface contacts the mold and the tire is thus vulcanized with a perfect impression of the mold detail.

Tire mold vents commonly take the form of small diameter holes drilled through the mold wall normal to the interior surface. Most commonly modern venting utilizes so-called 'insert vents' which are small bore tubes introduced through the mold wall. Once any trapped air has vented through the hole, rubber begins to flow through the vent. However, the small diameter of the hole ensures that the rubber cures rapidly, thus plugging the vent hole and sealing the mold. After completion of the tire curing process, these plugs of rubber which are still attached to the tire surface are pulled out of the vent holes when the tire is demolded.

Such plugs of rubber or, 'spue-pips' as they are commonly known, detract from the visual appeal of the molded tire and are usually removed by trimming. This trimming operation is time consuming and thus adds to the cost of producing the tire.

Also, a problem may occur if the cured spue-pip breaks off when the tire is being demolded and thus remains blocking the vent hole. Such a blocked vent may not be immediately apparent and can cause subsequent poor quality moldings.

To solve the above-mentioned problems so-called "spueless vents" have been proposed, which allow trapped air to escape, but which close to prevent rubber flow.

U.S. Pat. No. 4,492,554 and U.S. Pat. No. 4,347,212 disclose examples of such 'spueless' vents. These known vents comprise a valve held normally open by a coil spring to allow the passage of air. The valve is closed by flowing rubber which moves a valve head portion against the spring tension into seated engagement with a valve seat. However, these vents comprise an assembly of at least four separate components and are thus relatively complicated and expensive, and as such, have not found wide utility.

SUMMARY OF THE PRESENT INVENTION

Accordingly, it is an object of the present invention to provide a spueless vent which is simple in construction and therefore less expensive.

According to the present invention a vent for a mold comprises a vent main body, a valve closure member having an upper end face for positioning at the surface of the mold cavity, the closure member being moveable with respect to the vent main body for opening and closing the vent, a spring opening mechanism formed integrally with the vent main body for opening the vent, and a valve seat between the closure member and the main body wherein the vent is closed by material in the mold cavity contacting the upper end face of the valve closure member.

The vent is preferably formed of a moldable plastics material.

BRIEF DESCRIPTION OF THE DRAWINGS

Further aspects of the present invention will become apparent from the following description of embodiments of the invention in conjunction with the following schematic drawings in which.

DETAILED DESCRIPTION OF THE PREFERRED EMBODIMENTS

Figure 1C:
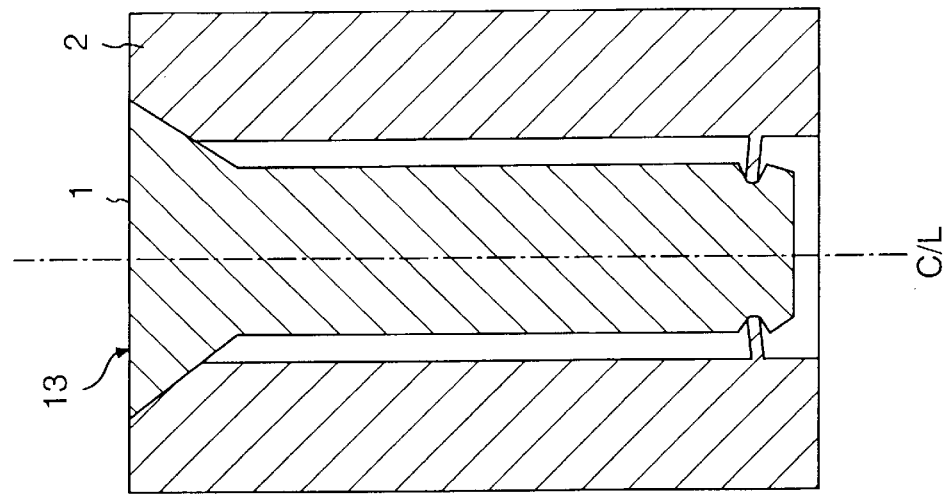
FIGS. 1A, 1B and 1C show an insert vent according to the first embodiment of the invention.
Figure 1B:
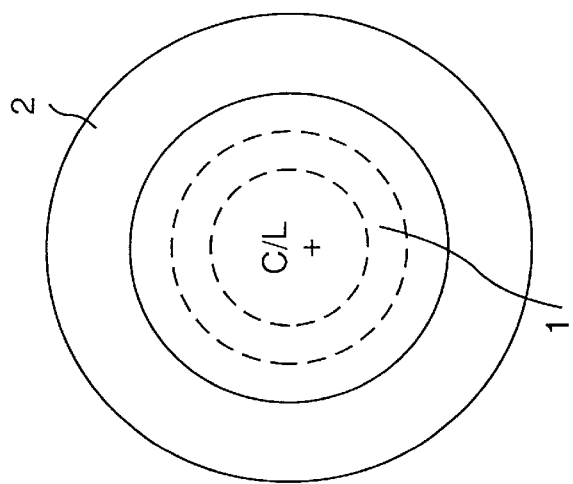
Figure 1A:
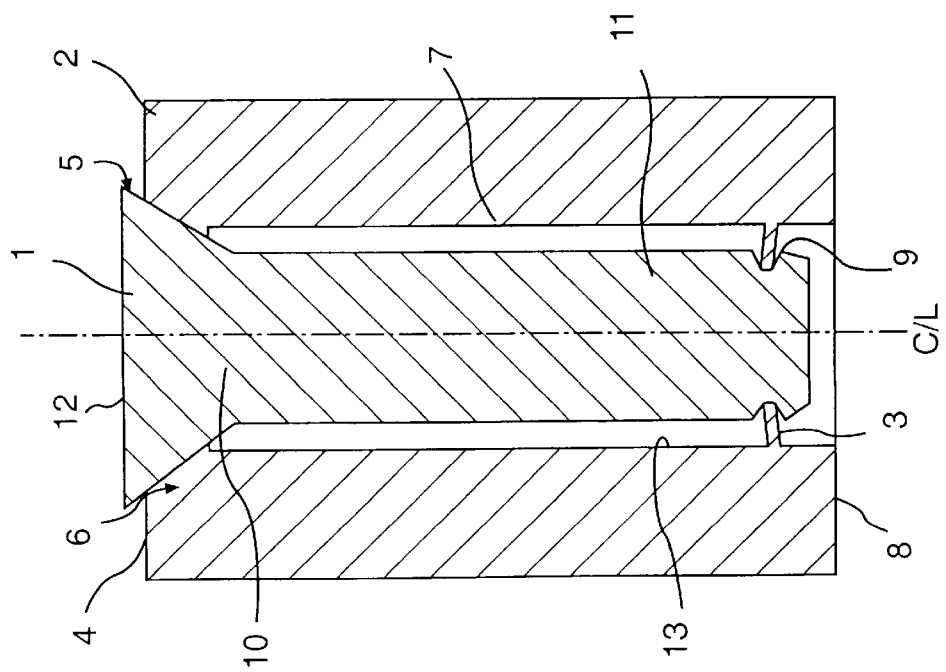
Figure 5:
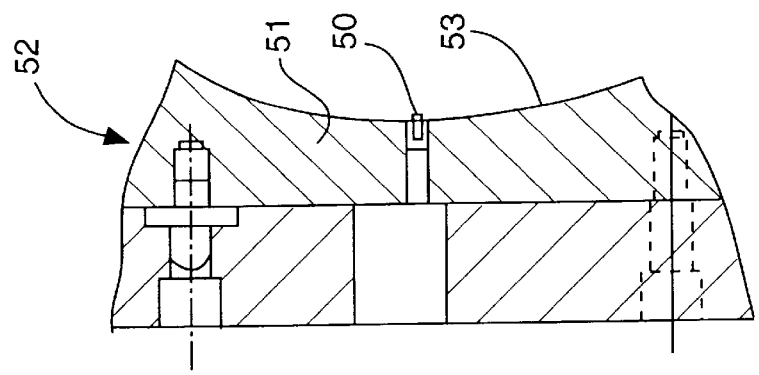
FIG. 5 shows an insert vent according to the invention, set in place in the sidewall region of a tire mold.

Shown in FIGS. 1A and 1B are a sectional side elevation and a plan view, respectively, of an insert vent according to the present invention. This vent 50 is shown in situ in the sideplate of a tire mold 52 in FIG. 5.

Accordingly the vent comprises a vent main body 2 having the form of a hollow right cylindrical tube.

The main body is open-ended having a coaxial cylindrical vent hole 7 connecting an upper end face 4, for fitting flush with the interior surface 53 of a cavity of a mold (52), with the bottom end face 8 which is open to atmosphere thus providing a pathway to facilitate removal of trapped air.

Down the center of the main body 2 extends a valve closure member 1 comprising in its upper part a valve head 10 and in its lower part a valve stem 11 in the form of a cylindrical rod both located coaxially with the vent main body 2. In the region of the upper end face 4 of the vent main body 2 the shape of the valve head 10 has the form of a truncated cone having a conical surface 5 which is a complementary shape to a conical valve seating surface 6 formed on the interior region of the vent main body upper end face 4. These complementary shaped surfaces 5 and 6 thus form a valve seat between the valve closure member 1 and the vent main body 2. The cross-sectional diameter of the valve stem is less than the diameter of the vent hole 7 in order to provide an air escape passage.

In the region of the bottom end of the vent, the vent main body is provided in its interior with integral spring opening mechanism 3 which projects radially inwardly into the hole 7 and engages with an annular slot 9 formed in the valve stem portion 11 of valve closure member 1. Thus, the spring mechanism serves both to locate centrally and hold the valve closure member 1 within the valve main body 2 and also to hold the vent in a normally open state shown in FIG. 1A, wherein the upper end face 12 of the valve closure member is held proud of the upper end face 4 of the valve main body 2 and the conical surface 5 of the valve closure member 1 and the valve seating surface 6 of the vent main body 1 are thus held apart. In this open state, the vent thus provides an air escape path from the interior of the mold to atmosphere via the vent hole 7 connecting the vent upper face 4 to the vent lower face 8.

When all the trapped air has vented to atmosphere the flowing rubber impinges on the upper end face 12 of the valve closure member 1 and pushes the valve closure member into the vent main body 2 against the spring force provided by the spring mechanism 3 so that the conical surface 5 of the valve head 10 comes in seated engagement with the complementary valve seating surface 6. Accordingly with the vent now in the closed position, as shown in FIG. 1C, the vent closure member 1 and the vent main body 2 together form a plane surface 13 on the interior surface of the mold and rubber flow into the vent hole 7 is prevented.

The vent remains closed throughout the molding cycle but opens again due to the integral spring opening mechanism 3 as soon as the molded article is removed.

In this embodiment, the spring opening mechanism 3 is provided as a projection from the interior wall 13 of the vent main body 2. This projection may be continuous around the whole of the internal periphery of the vent main body 2 and may be provided with holes or perforations as necessary to allow the passage of air. Alternatively, the spring opening mechanism may be provided as spring "fingers" as will be described later.

The spring opening mechanism 3 is provided in consideration of the combination of design and material properties. In this embodiment the spring opening mechanism 3 is effectively an integrally formed spring washer. Any material having suitable heat resistance and resiliency may be used for the vent main body and integrally formed spring opening mechanism. Such materials include metals such as spring steel or plastics materials such as engineering thermoplastics. Engineering thermoplastics such as reinforced nylons or glass-reinforced polyphenylene sulphide are preferred because they are readily formable by conventional injection molding techniques.

Figure 3:
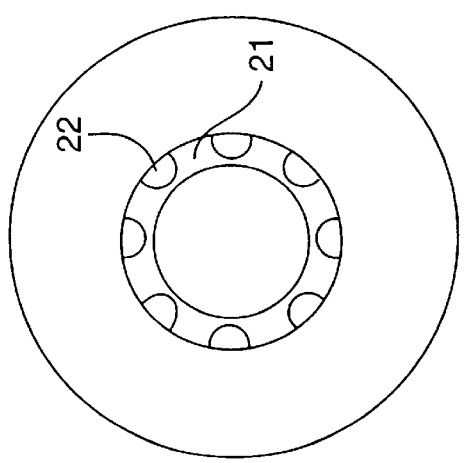
FIGS. 3 and 4 show sectional details of the insert vent of FIG. 2 taken along planes, A–A' and B–B' respectively.
Figure 4:
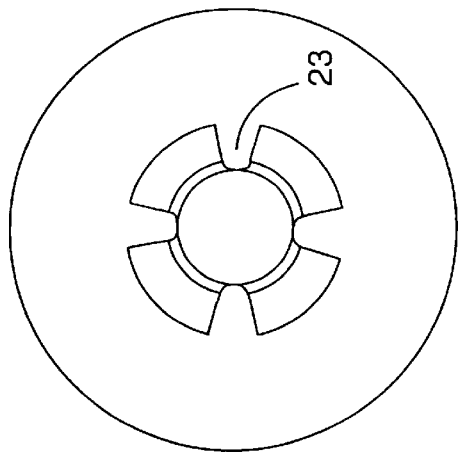
Figure 2:
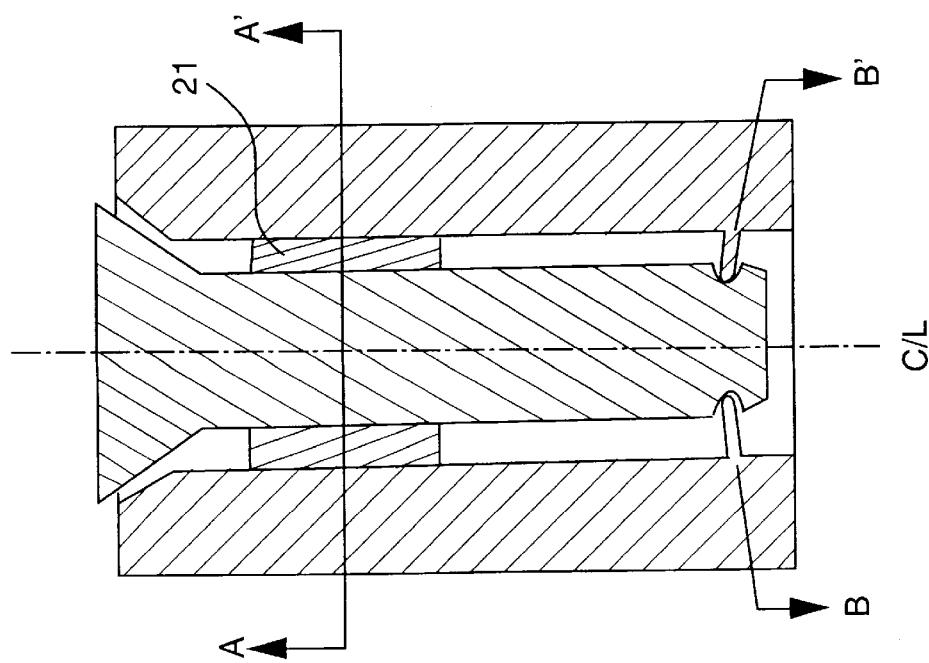
FIG. 2 shows another insert vent according to the invention.

The valve closure member 1 may be formed in a different material to the vent main body 2 and spring opening mechanism 3. However, it is preferred to form the valve closure member 1 and the vent main body in the same material because of thermal expansion considerations. In another embodiment of the invention shown in FIGS. 2 to 4, the valve stem 11 is further centralized within the vent hole 7 by a collar 21 having longitudinally extending holes or flutes 22 to allow escaping air to pass through to atmosphere. These flutes 22 are shown in FIG. 3 which is a sectional view taken in plane 3–3' of FIG. 2. Preferably this fluted collar 21 is tightly fitted to either the valve stem 11 or the interior of the vent main body 2 and is a sliding fit on the other. Further in this second embodiment the spring opening mechanism 3 comprises a number, here four, of spring fingers 23, shown in FIG. 4 which is a sectional view taken through 4–4' in FIG. 2, which similarly to the first embodiment locate into an annular groove in the valve stem.

Mold insert vents as herein described have proved relatively simple and inexpensive to manufacture and effective in use in tire molding avoiding blocking by preventing rubber flow into the vent hole.

Having now described my invention what I claim is:

1. A vent for selectively communicating an interior of a mold cavity with an exterior thereof, the vent comprising:

a hollow vent main body having open opposing ends, one said open end defined by a valve seat therearound;

a valve closure member movably disposed within said vent main body so as to selectively close said vent main body when a portion of said valve closure member is seated in said valve seat; and a resilient spring mechanism attached to said vent main body and engaged with said valve closure member and being constructed and arranged to bias said valve closure member towards a position where said portion of said valve closure member is spaced away from said valve seat, thereby opening the vent.

2. The vent according to claim 1, wherein said valve closure member lies flush with said vent main body when said portion of said valve closure member is seated in said valve seat.

3. The vent according to claim 1, wherein said portion of said valve closure member includes a surface shaped in compliment to said valve seat.

4. The vent according to claim 3, wherein said surface is conical and said valve seat is conical.

5. The vent according to claim 1, wherein said spring mechanism comprises a resiliently flexible diaphragm member disposed about said valve closure member and having a radially distal portion thereof integral with said main body and a central portion engaged with said valve closure member, said diaphragm including a perforation formed therethrough.

6. The vent according to claim 1, further comprising a sleeve member disposed about a portion of said valve closure member within said main body, said sleeve member including an axially extending groove along a surface thereof so as to communicate one end of said main body with the other.

7. The vent according to claim 1, wherein said spring mechanism comprises a radially inward extending resiliently flexible tab having a radially outer end integral with said main body and a radially inward end engaged with said valve closure member.

8. The vent according to claim 1, wherein said spring mechanism and said main body are made from any one of a steel material and a plastic material.

9. The vent according to claim 8, wherein said main body and said valve closure member are made from the same material.

10. The vent according to claim 9, wherein said spring mechanism, said main body, and said valve closure member are made from one of reinforced nylon and glass-reinforced polyphenylene sulfide.

\* \* \* \* \*